UNITED STATES PATENT OFFICE.

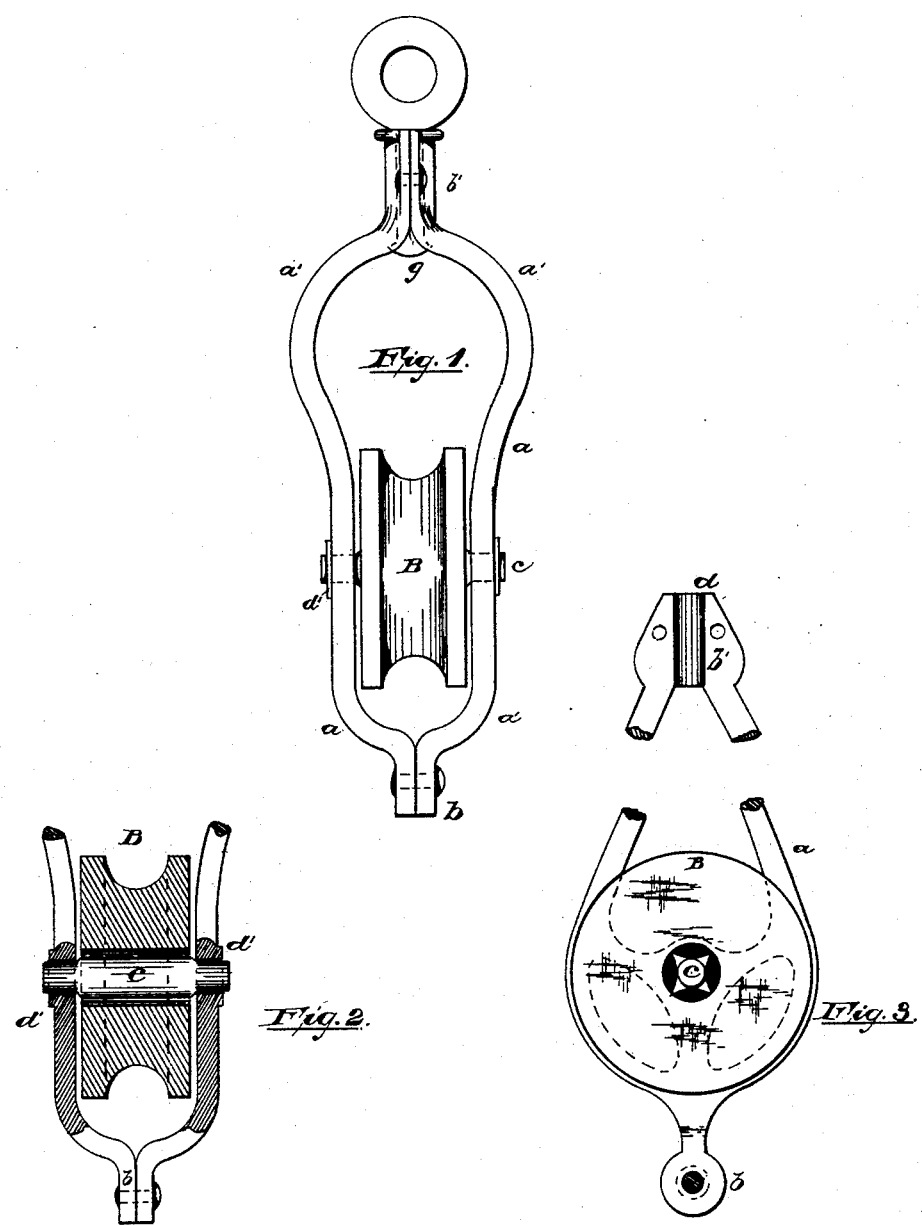

SIMON SEIB, OF NEWARK, NEW JERSEY.

CLOTHES-LINE PULLEY.

SPECIFICATION forming part of Letters Patent No. 327,326, dated September 29, 1885.

Application filed March 5, 1885. (No model.)

*To all whom it may concern:*

Be it known that I, SIMON SEIB, a citizen of the United States, residing at Newark, in the county of Essex and State of New Jersey, have invented certain new and useful Improvements in Clothes-Line Pulleys; and do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a pulley for clothes-lines of increased cheapness of construction and effectiveness; and it consists in the improved pulley having the arrangements and combinations of parts, substantially as will be hereinafter set forth, and finally be embodied in the clauses of the claims.

Referring to the accompanying drawings, in which like letters of reference indicate corresponding parts in each of the figures, Figure 1 is an elevation of a pulley. Fig. 2 is a vertical section of the same taken through the center of the wheel or sheave, and Fig. 3 is a side view, showing one of the side sections of the frame or block removed to show the wheel and spindle more clearly, and a socket in the remaining section for a certain swivel-eye.

In said drawings, $a\ a$ are side plates or castings which are turned at their ends, as at $a'\ a'$, to form bearings $b\ b'$, the latter being riveted together to form a complete frame or block.

B indicates a sheave or roller, made preferably of wood, with a perforation through the center to receive a spindle, $c$, which latter is rigidly secured in said sheave, and projecting from the sides thereof revolves in bearings $d'$, thus creating less friction than where the spindle is riveted rigidly in the frame and the sheave is loose on the spindle.

The upper bearings, $b'$, of the frame are vertically recessed on the inner face thereof, as at $d$, Fig. 3, so that when the bearings are secured together a passage is formed for the shank of a swivel-eye, $f$. When the said shank is clamped in position by riveting the two bearings together, the shoe $g$ of said shank prevents the withdrawal thereof through the passage, as will be understood.

Although I prefer the form and arrangement of the roller and spindle shown, I do not wish to be understood as limiting myself to it; and, furthermore, the said spindle may be employed in holding the lower portions of the frame together, instead of having the lower bearings for that purpose, the spindle in that event acting as a rivet; but although I may in some cases use the spindle in riveting the frame-sections together, I prefer and make especial claim to the frame riveted at top and bottom, so that the spindle may move freely, and thus take the wear from the roller.

What I claim as new is—

1. In a pulley, the sections $a\ a$, provided with recess $b$, adapted to hold the shank of the spindle-eye, said sections being fastened together, substantially as and for the purposes set forth.

2. In combination, the sections $a\ a$, provided with bearings $b\ b'$ at the top and bottom thereof, and intermediate bearings, $d'$, for the sheave, and having recesses $d$, adapted to hold the shank of the spindle-eye, said bearings $b'$ being fastened together, and said spindle-eye and the sheave B loosely journaled in said bearings $d'$, substantially as set forth.

In testimony that I claim the foregoing I have hereunto set my hand this 22d day of February, 1885.

SIMON SEIB.

Witnesses:
FREDK. F. CAMPBELL,
CHARLES H. PELL.